US007742750B2

(12) United States Patent
Scarpa et al.

(10) Patent No.: US 7,742,750 B2
(45) Date of Patent: Jun. 22, 2010

(54) SYSTEMS AND METHODS FOR ANTENNA DIVERSITY COMBINING FOR SATELLITE RADIO SIGNALS

(75) Inventors: Carl Scarpa, Plainsboro, NJ (US); Sharif Sazzad, Ewing, NJ (US); Christopher Strolle, Fort Washington, PA (US)

(73) Assignee: Sirius XM Radio Inc., New York, NY (US)

( * ) Notice: Subject to any disclaimer, the term of this patent is extended or adjusted under 35 U.S.C. 154(b) by 634 days.

(21) Appl. No.: 11/607,383

(22) Filed: Dec. 1, 2006

(65) Prior Publication Data

US 2007/0142009 A1      Jun. 21, 2007

Related U.S. Application Data

(60) Provisional application No. 60/741,781, filed on Dec. 1, 2005.

(51) Int. Cl.
*H04B 1/06* (2006.01)
(52) U.S. Cl. ............... 455/273; 455/139; 455/278.1; 375/150
(58) Field of Classification Search ............ 455/63.1, 455/63.4, 67.11, 562.1, 132, 133, 134, 135, 455/137, 138, 139, 226.1, 272, 273, 276.1, 455/278.1; 375/142, 150
See application file for complete search history.

(56) References Cited

U.S. PATENT DOCUMENTS 5,335,359 A * 8/1994 Tsujimoto et al. ............ 455/506
6,023,615 A * 2/2000 Bruckert et al. ............ 348/14.08
6,990,137 B2 * 1/2006 Smee et al. .................. 375/142
7,117,016 B2 * 10/2006 Kisigami et al. ......... 455/562.1
2003/0012299 A1     1/2003 Kuchi et al.

(Continued)

OTHER PUBLICATIONS

International Search Report and Written Opinion of the International Searching Authority, issued for corresponding PCT Application PCT/US06/61455, Nov. 20, 2007.

*Primary Examiner*—Blane J Jackson
(74) *Attorney, Agent, or Firm*—Kramer Levin Naftalis & Frankel LLP (57) ABSTRACT

Systems and methods are presented for digital antenna diversity combining. In exemplary embodiments of the present invention, at least two antenna signal paths can be communicably connected to a receiver. Each antenna signal path can be provided with an RF tuner communicably connected to a demodulator, which can estimate the signal to noise ratio (SNR) and time of arrival of its respective antenna signal. In exemplary embodiments of the present invention, a time alignment circuit can be communicably connected to each antenna signal path, and a maximum ratio combiner can be communicably connected to the time alignment circuit. In operation, the time alignment circuit can use the time of arrival estimate to align the multiple signals and the maximum ratio combiner can use the SNR estimate obtained for each antenna signal to respectively weight each signal and thereby generate a combined output signal. In exemplary embodiments of the present invention, a switch diversity combiner can be further provided, and can quickly detect when an antenna signal is entering a fade, allowing the maximum ratio combiner to set that signal's weight to zero. In exemplary embodiments of the present invention, a digital diversity combiner can be provided in a stand alone integrated circuit, or can be integrated in a larger integrated circuit, such as, for example, a satellite radio overlay processor.

20 Claims, 6 Drawing Sheets

U.S. PATENT DOCUMENTS

2003/0092379 A1* 5/2003 Brothers et al. ............ 455/12.1
2004/0198265 A1* 10/2004 Wallace et al. .............. 455/118
2005/0136856 A1* 6/2005 Goldberg .................... 455/101
2006/0073801 A1* 4/2006 Wang et al. .............. 455/226.1

* cited by examiner

SYSTEMS AND METHODS FOR ANTENNA DIVERSITY COMBINING FOR SATELLITE RADIO SIGNALS

CROSS REFERENCE TO OTHER APPLICATIONS

This application claims the benefit of the U.S. Provisional Patent Application No. 60/741,781, filed on Dec. 1, 2005, hereby incorporated herein by this reference.

TECHNICAL FIELD

The present invention relates to satellite broadcast communications, and more particularly to systems and methods for improving the reception of broadcast satellite signals by digitally combining signals from diverse antennas.

BACKGROUND INFORMATION

Conventional antenna diversity combining techniques are commonly implemented in the analog domain at either a radio frequency (RF) or a low intermediate frequency (IF) frequency, such as, for example, in mobile FM radio applications. Numerous techniques are conventionally used in the analog domain, such as, for example, switch diversity, maximum ratio diversity, and equal power combining, to implement antenna diversity combining. Although difficult to implement in the analog domain, generally these methods work well as long as each antenna signal does not suffer from strong adjacent channel interference. However, in modern satellite radio broadcasting systems, conditions are often such that strong co-channel interference can exist. This can be due to the disparity in signal level between a given channel receiving a satellite signal and a near frequency terrestrial signal (either "friendly" or "unfriendly"). This often results in poor results from such analog combining.

What is thus needed in the art is an alternative implementation of antenna diversity combining that is easy to implement and that can overcome or ameliorate the problems of such prior art systems and techniques.

SUMMARY OF THE INVENTION

Systems and methods are presented for digital antenna diversity combining. In exemplary embodiments of the present invention, at least two antenna signal paths can be communicably connected to a receiver. Each antenna signal path can be provided with an RF tuner communicably connected to a demodulator, which can estimate the signal to noise ratio (SNR) and time of arrival of its respective antenna signal. In exemplary embodiments of the present invention, a time alignment circuit can be communicably connected to each antenna signal path, and a maximum ratio combiner can be communicably connected to the time alignment circuit. In operation, the time alignment circuit can use the time of arrival estimate to align the multiple signals and the maximum ratio combiner can use the SNR estimate obtained for each antenna signal to respectively weight each signal and thereby generate a combined output signal. In exemplary embodiments of the present invention, a switch diversity combiner can be further provided, and can quickly detect when an antenna signal is entering a fade, allowing the maximum ratio combiner to set that signal's weight to zero. In exemplary embodiments of the present invention, a digital diversity combiner can be provided in a stand alone integrated circuit, or can be integrated in a larger integrated circuit, such as, for example, a satellite radio overlay processor.

DETAILED DESCRIPTION OF THE INVENTION

The present invention is based upon the principles of antenna diversity, which were discovered over fifty years ago. In his 1958 paper, Brennan [1] describes the various forms of diversity—time, frequency and space—and presents a detailed mathematical analysis of a form of space (antenna) diversity processing called "maximal-ratio diversity". In what follows, this technique will be referred to as maximum ratio combining (MRC).

In general, there are two main benefits that antenna diversity provides—robustness to fading and improved Signal to Noise Ratio (SNR). Robustness to fading is obtained when antennas are spaced sufficiently far (typically >½ wavelength) apart so that the dynamic fade at each antenna is uncorrelated Thus, at some instant of time, if one of the antennas is in a fade the other antenna will potentially be in the clear. The improvement in SNR can thus be obtained, for example, by adding coherently aligned signals from all antennas. This will have the effect of averaging noise that is present in each antenna path, thereby achieving a reduction in the noise variance. Under a pure Rayleigh faded channel (totally uncorrelated signals across each antenna), a typical antenna diversity gain of 6 db or more can be expected for just two antennas. This is because such a system can take advantage of the time diversity between two uncorrelated fades. Greater gain can be achieved using more antennas, with quickly diminishing returns after 4 antennas are used. This is generally due to the fact that the likelihood of N−1 antennae all being in a fade, such that the contribution of an Nth antenna would significantly improve the combined signal, decreases with increasing N.

In a digital diversity implementation two or more antennas can be used for reception, with each antenna feeding a separate digital demodulator. Actual antenna combining can then be performed, for example, after demodulation of each antenna path in the QPSK symbol domain in a technique commonly known as post-detection MRC combining. As with any antenna diversity technique, the task that must be performed before any combining can occur is proper signal alignment in time, phase and amplitude. These three tasks can be handled by an exemplary digital diversity combiner in a fairly straight forward manner, as described below.

1. Overview of Digital Diversity Combining Systems

In exemplary embodiments of the present invention, signals from diverse antennas can, for example, be respectively demodulated and combined in the digital domain directly at the symbol level. Thus, in exemplary embodiments of the present invention, using, for example, two antennas, digital domain diverse signal combining can be implemented, for example, by using two independent baseband demodulators. In such exemplary systems, for example, each of the two antennas can feed independent front end tuners which are respectively connected to baseband demodulator chips. Each of the baseband demodulator chips can, for example, output I/Q symbol data, start of frame markers, and noise power measurements. This approach is outlined in FIG. 1, next described.

Figure 1:
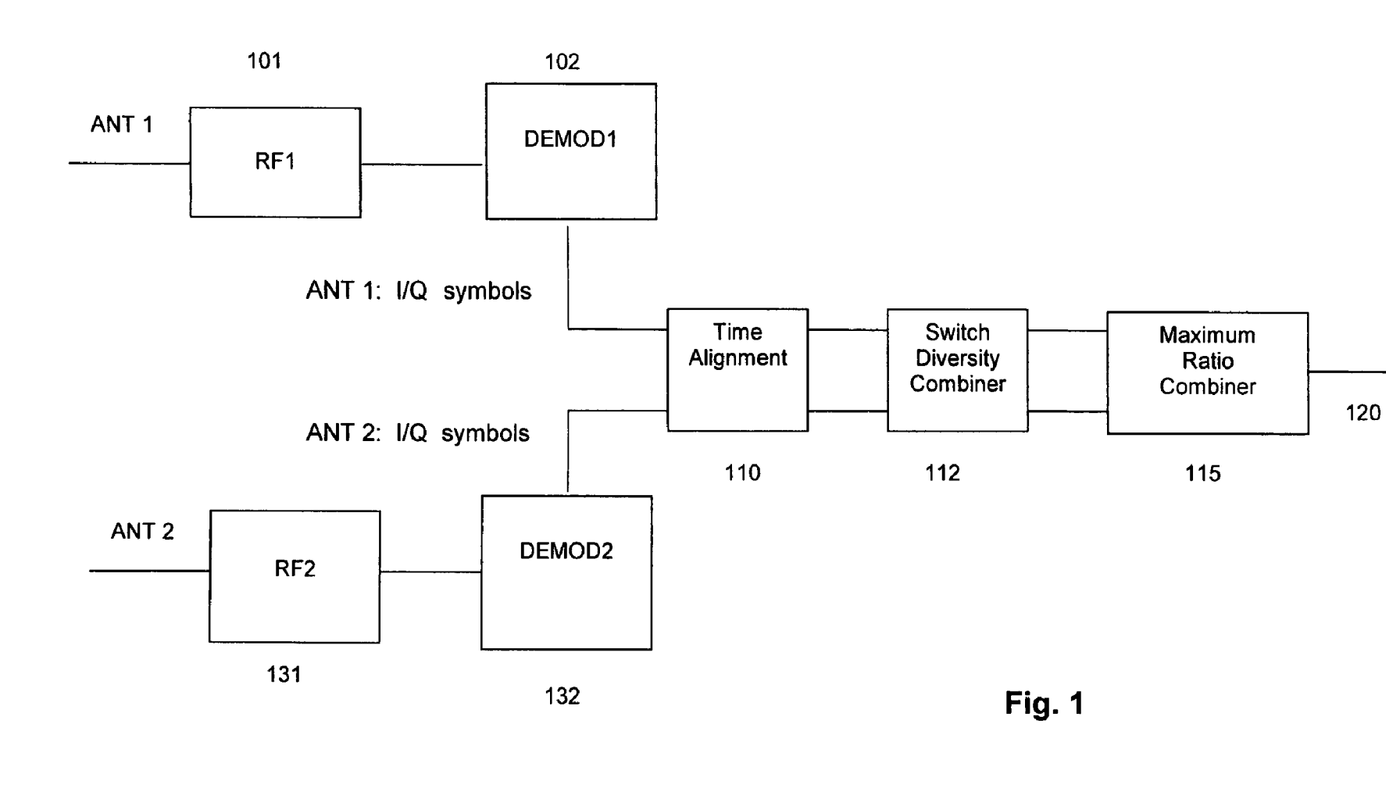
FIG. 1 illustrates a digital domain diverse antenna combining system according to an exemplary embodiment of the present invention.

With reference to FIG. 1, two antenna signals ANT1 and ANT2 are seen at the top and bottom of the left side of the figure, respectively. These signals have been received on two antennas that are spatially diverse. For example, such antennae can, for a satellite broadcasting system using a carrier wavelength of approximately 2320 Mhz, be spaced apart by greater than ½λ, or at least 1.45 cm. In exemplary embodiments of the present invention, such antennae can, for example, be located at two different points of an automobile roof, which are between 2-6 feet apart. The ANT1 signal can be coupled to RF tuner RF1 101, and from there can pass to base band demodulator DEMOD1 102. In parallel fashion, the ANT2 signal is connected to RF tuner RF2 131 and from there passes to base band demodulator DEMOD2 132. Demodulators 102 and 132 can, for example, be conditional I/Q demodulators well known to those skilled in the art, or they can be custom designed IC chips or portions thereof. At the outputs of each of DEMOD1 and DEMOD2 are a stream of I/Q symbols for each respective antenna path.

In exemplary embodiments of the present invention, each of the diverse antenna signals, after being respectively demodulated, can, for example, be processed by the same hardware. This can provide for minimal delay differences between the various signal processing paths. In such exemplary embodiments, the arrival time difference between I/Q data symbols from each demodulator can thus be assumed to be solely that induced by the channel.

Continuing with reference to FIG. 1, the multiple antenna signal paths, now comprising demodulated I/Q symbols, can, for example, be fed into a time-alignment circuit 110, from there to a switch diversity combiner 112, and from there, to a maximum ratio combiner ("MRC") 115. In the MRC, as described below, multiple signals from the various antennas can be combined into a combined antenna output 120, where each antenna signal input to the MRC can, for example, contribute to combined output 120 according to a weight ascribed to it. A greater relative weight reflects a greater confidence in the relative accuracy of that signal vis-à-vis the other signal, or signals, from the other antennae.

In general, to implement maximum ratio combining across two or more antennas, general parameters are estimated. For example, relative signal amplitude, relative phase, and relative time of arrival of the diverse signal paths can be estimated and compensated for in any combining methodology. In exemplary embodiments of the present invention, all three of these parameters can be supplied by a demodulator chip set, such as, for example, a conventional demodulator chip set used in processing satellite digital audio radio signals such as that used by Sirius Satellite Radio, Inc. Such a demodulator chip set can, for example, look at the incoming signal stream for markers, and using appropriate buffers, line up the incoming signals. This process is described more fully below.

In exemplary embodiments of the present invention, signal amplitude can be obtained from SNR measurements supplied by a baseband demodulator at the start of each physical frame packet. Constellation phase ambiguity can, for example, be automatically removed by circuitry within the baseband processor, forcing symbols to always be in the correct quadrants while the demodulator holds lock. This can be done, for example, by detecting a known marker in the datastream, such as, for example, a CAZAC sequence, as described below. CAZAC sequences are those that are Constant Amplitude Zero Auto-Correlation sequences. Such a CAZAC sequence, having 24 pairs of bits, can be, for example     private int[ ] CAZAC_I={−1, 1, 1, −1, −1, −1, −1, −1, 1, 1, −1, −1, 1, −1, 1, −1, −1, 1, 1, −1, −1, −1, −1, −1};

private int[ ] CAZAC_Q={1, 1, −1, −1, −1, −1, −1, −1, −1, −1, 1, 1, −1, 1, −1, 1, −1, 1, 1, −1, −1, −1, −1, −1, −1};

or, for example, any sequences which meet the CAZAC criteria, including pseudo-random sequences. Finally, for example, the time of arrival of each symbol can be conveyed by a start of physical frame packet marker that can also be supplied by the baseband processor. In exemplary embodiments of the present invention, the CAZAC sequence can, for example, perform both of these functions.

As can be seen with reference to FIG. 1, Time Alignment Module 110, Switch Diversity Combiner 112, and Maximum Ratio Combiner 115 collectively perform the combination of the multiple signals. In exemplary embodiments of the present invention, a time alignment module can estimate the time of arrival difference between each antenna path. As noted, this can be accomplished, for example, by noting the start of a physical frame marker in each base band demodulator 102, 132. The time difference between each marker indicates how each data stream is delayed with respect to the other. In general, this delay is expected to be constant inasmuch as each symbol travels through the same detection logic. Once determined, the channel should not induce any additional delays, regardless of vehicle motion, speed and/or direction. This is due to the large distance between the receiving antennae and the location/speed of each broadcast satellite, which makes the lines of transmission from the satellite to each antenna effectively parallel.

The time difference between antenna paths can be corrected by a simple shift register, whose delay can, for example, be set equal to the arrival time difference. In exemplary embodiments of the present invention, the arrival time difference between signal paths can be made to be less than one symbol, allowing for a simple time delay correction circuit, such as Time Alignment module 110. For example, a radio wave traveling at the speed of light traverses one meter in approximately $0.333 \times 10^{-8}$ seconds, or 3.33 nanoseconds. For an exemplary one meter distance between the two antennae, even if the entire distance must be traversed by one incoming signal and not the other (which in general is not the case unless a satellite and the two antennae are co-linear, such as, for example, when a satellite is low in the sky and an automobile, with two diverse antennae, is on an incline of the same angle relative to the surface of the earth as that which the satellite has relative to the horizon) thus taking the full 3.33 nanoseconds, this arrival time difference is still dwarfed by an exemplary symbol duration of 250 microseconds, which is commonly used.

In exemplary embodiments of the present invention, signal amplitude can be obtained by noting the noise power estimate that is supplied by each of demodulators DEMOD1 102 and DEMOD2 132. Once aligned, the proper weighting for each I/Q symbol pair can, for example, be determined at the beginning of each physical frame marker. This value can, for example, be held constant until a new estimate of noise for either channel is received (at the beginning of each physical frame). To determine the weighting for each antenna path, the following optimal weighting scheme can, for example, be utilized:

$$w1=(\sigma_2)^2/[(\sigma_2)^2+(\sigma_1)^2]; \text{ and}$$

$$w2=(\sigma_1)^2/[(\sigma_2)^2+(\sigma_1)^2],$$

where:

w1 is the weight for I/Q symbols applied to the first antenna path;

w2 is the weight for I/Q symbols applied to the second antenna path;

Sigma$_1$ ($\sigma_1$) is the noise power variance via the first antenna path; and Sigma$_2$ ($\sigma_2$) is the noise power variance via the second antenna path.

Once time aligned and optimal weights are determined (with symbol phase correction being performed by the respective demodulators), diversity combining can be performed, for example, using the following equation:

$$Ic+j*Qc=(I1+jQ1)*w1+(I2+jQ2)*w2,$$

where I1 and I2 are the in-phase symbols derived from antenna paths ANT1 and ANT2 respectively, Q1 and Q2 are the quadrature symbols derived from antenna paths ANT1 and ANT2 respectively, and Ic/Qc are the respective combined in-phase and quadrature symbols output by the antenna combining function, i.e. the data stream appearing at 120, being the output of MRC 115.

In a typical line of sight channel, each antenna path can experience the same fading with slight time differences due to the spatial separation of each antenna. Theoretically, maximal gain can be achieved when fading is de-correlated as much as possible. Generally, however, this is not possible due to the fact that the same signal is received on each antenna (with a slight time of arrival difference). Thus, to maximize the performance of diverse antennas, the distance between these antennas can be increased to maximize the difference in fading arrival time. As antennas are separated, the difference in fading arrival times then becomes a function of antenna spacing and vehicle speed, i.e., as given by $\Delta t=d/v$, where d=antenna spacing (feet) and v=vehicle speed (feet/second). For exemplary values of a 3 foot separation between antennae and a speed of 60 mph for an automobile equipped with the two antennae, $\Delta t=0.0682$ sec., or 68.2 msec.

Thus, as each antenna path goes into a fade, the noise power estimate made at the demodulators can experience a lag between the true signal level and that which the noise estimate is predicting. This situation opens the possibility of having an incorrect weighting between the various antenna paths until the noise power measurement "catches up" with the actual noise power. During this time interval, there is a need to quickly avoid noise estimation errors due to such a measurement lag by, for example, using a fast acting switch diversity circuit, next described.

Switch Diversity

In exemplary embodiments of the present invention, a switch diversity circuit can address the above described noise measurement lag phenomena and can improve overall antenna combining results. It can, for example, quickly determine if one of the antenna signals is going into a fade, and can thus avoid using noise power measurements that may be stale. One method, for example, to make this determination is by tracking a known bit-sequence periodically sent in the broadcast signal. For example, in an digital satellite radio transmission, such as, for example, that broadcast by the Sirius Satellite Radio, Inc., each physical frame can be preceded by a 24 symbol CAZAC sequence, (also known as a 48-bit "training sequence"), that is transmitted at the beginning of each physical frame. Given the number of physical frames transmitted, this CAZAC sequence is repeated approximately 3670 times per second. Such a CAZAC sequence can be, for example, the 48 bit (24 I/Q pair) sequence described above. If one antenna is going into a fade, this CAZAC sequence will be distorted on the associated signal, not only by noise, but also by carrier recovery slippage.

Thus, in exemplary embodiments of the present invention, a switch diversity circuit can monitor a CAZAC (or equivalent) sequence and quickly determine (e.g., at a physical frame rate of 3670 times a second) if the signal is in a fade far faster than can be done by monitoring the noise power measurements in the demodulator module. Once a signal fade is detected, the MRC combing equations can be modified to place zero weight on an antenna path that is experiencing a loss of CAZAC detection. This method of quickly switching between antenna paths and MRC combining can essentially bring system performance to true MRC combining with no noise power measurement delay.

In exemplary embodiments of the present invention, a CAZAC sequence can be transmitted periodically, with a period less than the coherence time of the channel. In alternate exemplary embodiments, said period can be less than a half or other integral fraction of said coherence time.

2. Detailed Description of Exemplary Digital Diversity Combiner

Next described in detail, with reference to FIGS. 2-6, is an exemplary digital diversity combiner ("DDC") that can be implemented in an integrated circuit. A block diagram of the exemplary DDC is provided in FIG. 6, and a description of its components and operation follows, with reference to FIGS. 2-5.

2.1 Achieving Proper Alignments

As noted above, the three tasks of any antenna diversity system are to properly align the diverse signals in time, phase and amplitude. As also noted, this task is extremely difficult to do in the analog domain due to the very sensitive nature to errors in the combining process. Numerous analog approaches have been attempted with limited success. However, the task is greatly simplified by performing the alignment in the digital domain. The task is further simplified by performing the alignment post demodulation at the symbol level. Combining symbols has all the benefits of pre-detection combining while allowing for a far easier implementation. The cost of post-detection combining is that an additional demodulator is required for each TDM signal received. Considering the state of ever shrinking IC process technology, this cost can generally be considered as of lesser importance.

2.2 Amplitude and Phase Alignment

Since combining is performed at the QPSK symbol level via a separate demodulator for each antenna path, amplitude and phase alignment are already guaranteed by the demodulation process. For example, amplitude adjustment between the two antennas can be performed by Automatic Gain Control ("AGC") functionality and phase alignment can be performed by a carrier recovery circuit. Similarly, unambiguous phase alignment can be guaranteed by the usage of a CAZAC pattern at the start of each physical frame, as described above.

Hence the only real task such a digital diversity combiner needs to perform post-demodulation is time alignment.

2.3 Time Alignment

As noted, the real task of a digital diversity combiner (DDC) reduces to performing a fairly complex time shifting operation. In exemplary embodiments of the present invention, a DDC can be designed to operate from two completely independent demodulators, each with its own system clock, such as, for example, at 68 Mhz. A series of steps then needs to be performed in order to be able to MRC across received symbols.

2.4 Sample Clock Alignment

In exemplary embodiments of the present invention, soft symbol data, such as, for example, 10-bit soft symbol data, can be provided as an output from each demodulator chip. This data consists of I,Q constellation values prior to forward error correction decoding. In exemplary embodiments of the present invention, a DDC can accept such a 10-bit data stream over a proprietary data bus. Examples of such buses are the input lines in FIG. 6, respectively labeled as "Antenna 1, I, Q Symbols" and "Antenna 2, I, Q Symbols." It is important to realize that the two 10-bit data busses can be completely asynchronous with respect to each other. Thus, the first task at hand is to re-clock each soft symbol stream onto a common clock domain. Such clock domain can be, for example, that of the demodulator connected to antenna 1 or, for example, that of the demodulator connected to antenna 2. The antenna chosen is known as the "anchor antenna." In exemplary embodiments of the present invention, soft symbol data from the demodulator connected to antenna 2 can be re-clocked onto the sampling clock domain of antenna 1. Thus, such embodiments use antenna 1 as the anchor antenna. In exemplary embodiments of the present invention, the choice of which antenna is the anchor can be adjustable via a register bit setting, and is thus user programmable. Alternatively, it can, for example, be performed automatically, choosing the clock of the most reliable data stream at a given time. Sample clock alignment can be performed by using short FIFO buffers for each 10-bit data path, as is known in the art.

2.5 Symbol Clock Alignment

After each data path is re-clocked to the same clocking domain, the next task is to clock each 1 0-bit soft symbol onto the same symbol clock. In exemplary embodiments of the present invention, there can be approximately 18 sample clock ticks for each symbol clock (3.7584 Mhz). Each demodulator can, for example, have its symbol enable anywhere within this spread of clock ticks. The worst case alignment possible would be thus be at approximately 9 clock ticks. Thus, the job of a symbol clock alignment circuit is to align the non-anchor symbol data to the symbol enable of the anchor antenna. This process can, for example, also be performed via FIFO buffering, using known techniques.

2.6 Physical Frame Alignment

After symbol alignment there is no guarantee that the anchor and non-anchor antenna data are perfectly aligned in time. All that is guaranteed is that symbol data is aligned. A last step is thus to ensure that a given symbol from antenna 1 is aligned with the exact same symbol from antenna 2. In exemplary embodiments of the present invention, this is the task of the physical frame alignment circuit.

Figure 2:
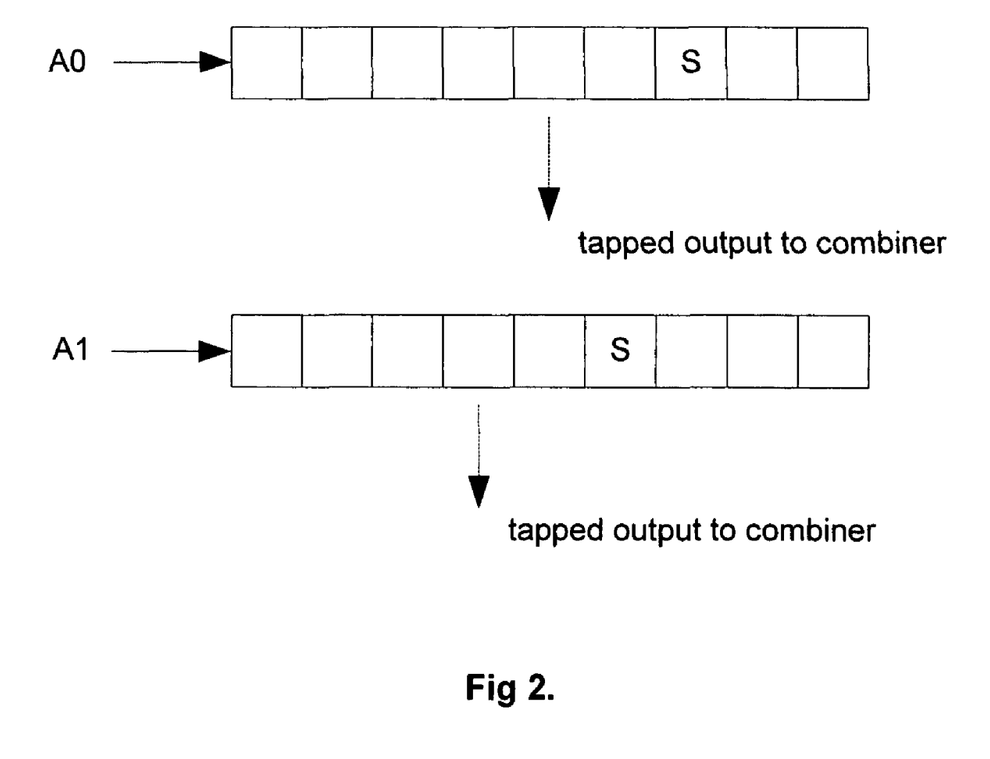
FIG. 2 depicts an exemplary physical frame alignment system according to an exemplary embodiment of the present invention.

To achieve physical frame alignment, In exemplary embodiments of the present invention, a system of tapped delay lines can, for example, be used to compensate for any relative delays that may exist between the symbol aligned outputs. An exemplary system of tapped delay lines is illustrated in FIG. 2. With reference thereto, samples output from each of the two demodulators can be input to the tapped delay lines. The "S" in FIG. 2 represents the occurrence of a physical frame sync pulse for the respective antenna paths. In the depicted example, the PHY (physical) frame sync pulse for A1 lags that for A0 by one symbol period. It is this last alignment that must be compensated for in order to properly perform MRC combining of the post-detected symbol data from each antenna.

Figure 6:
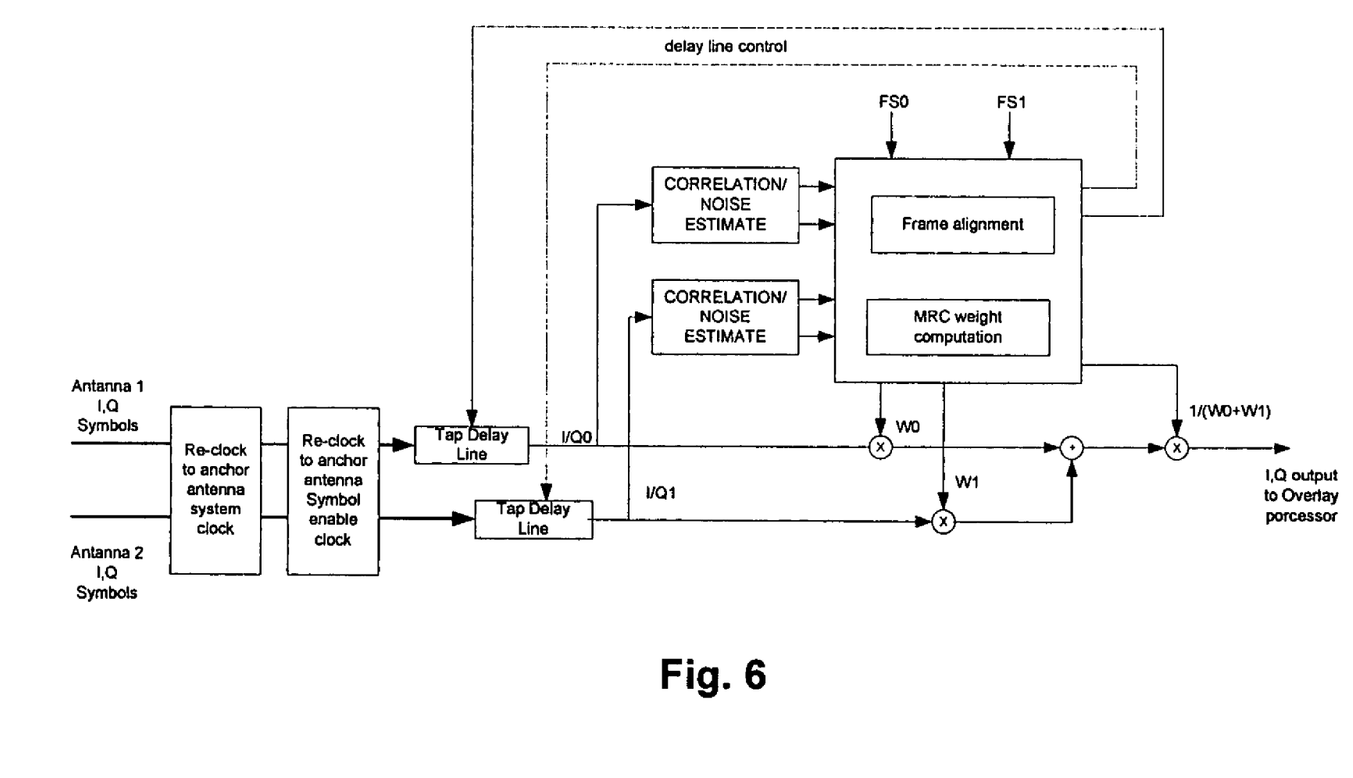
FIG. 6 illustrates an exemplary integrated digital diversity combining system according to an exemplary embodiment of the present invention.

In exemplary embodiments of the present invention, antenna combiner hardware can, for example, track the offset between the PHY frame boundaries of each antenna path. Any difference between the PHY frame boundaries can thus result in a shift in the tap delay line output pointer. This is shown in FIG. 6, for example, by the feedback lines labeled "delay line control", running from the frame alignment module to the Tap Delay Lines for each signal path. This shift in the pointers is thus an attempt to compensate for the symbol time delta between the two antennas. The tapped delay lines can, for example, be sized so as to handle differences of up to eight symbols. In exemplary embodiments of the present invention, under normal operation when both demodulators are locked, the time difference between the two antenna paths is typically no more than one symbol.

In the example situation depicted in FIG. 2, the time difference is one symbol. Thus, the combiner hardware can adjust the tapped delay line output points to realign the symbol data for the two antennas. These tapped outputs (for example, I/Q 0 and I/Q 1 in FIG. 6) can then, for example, be used to feed the antenna combining process. Since the samples from the two antenna paths are now fully aligned, mis-combining is avoided.

3. MRC Combining

3.1 Noise Estimate Computation

In exemplary embodiments of the present invention, an accurate noise estimate is vital to the operation of an MRC combiner. In exemplary embodiments of the present invention, the noise estimates for each antenna path can be used to derive MRC combiner weights. A reliable and accurate noise estimate ensures that the two (or multiple) antenna paths are being appropriately processed.

Thus, for example, a CAZAC noise measurement can be computed using the 24 CAZAC symbols of the exemplary CAZAC sequence described above. In exemplary embodiments of the present invention, the noise measurement can be, for example, the Euclidian distance between the observed symbol data and the ideal CAZAC symbols. This can be written as follows:

$$N^{CAZAC} = \sum_{k=0}^{23} |C_k - S_k|^2$$

where $C_k$ is the $k^{th}$ CAZAC symbol and $S_k$ is the $k^{th}$ observed symbol from an antenna path (on the PHY frame boundary). The quantity $N^{CAZAC}$ can, for example, be computed every PHY frame period and can, for example, be averaged using the following equation:

$$\overline{N}^{CAZAC} = \alpha \times N^{CAZAC} + (1-\alpha) \times \overline{N}^{CAZAC}$$

Where $\alpha=0.25$, and initially $\overline{N}^{CAZAC}=0$.

Such exemplary averaging can be performed to reduce the effect of "outliers" on the noise estimate. However, in exemplary embodiments of the present invention too much averaging can be avoided in order to keep the CAZAC noise measurement relevant in time. Thus, if α is small then the CAZAC noise estimate will adapt too slowly and will reflect a state of nature that lags the current state.

Figure 3:
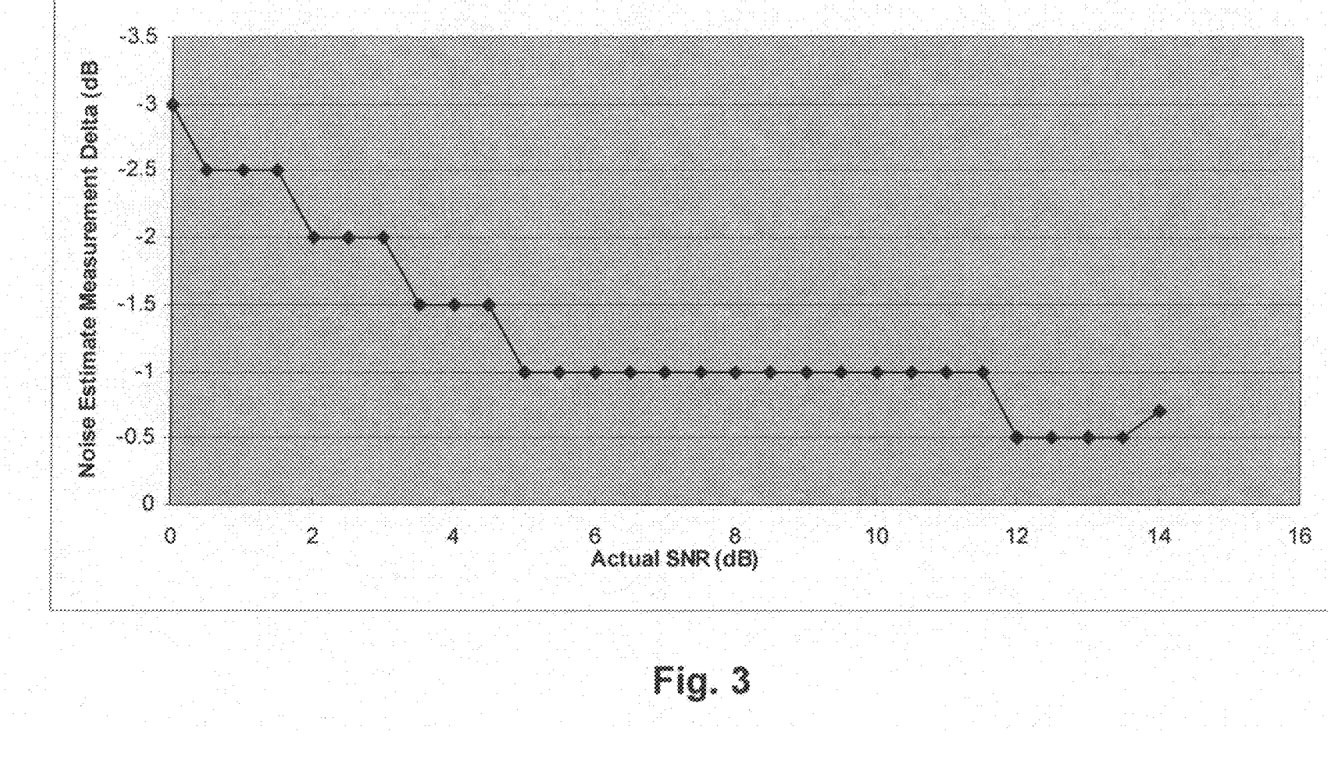
FIG. 3 depicts the deviation between an identification signal SNR and the actual SNR according to an exemplary embodiment of the present invention.

In fact, observation has shown that the raw CAZAC noise estimate, $\overline{N}^{CAZAC}$, starts to diverge from the true noise level at SNRs below 10 dB. FIG. 3 depicts an exemplary deviation between the CAZAC SNR and the actual SNR.

The reason for this deviation, i.e. the underestimate of the noise level, is due to clipping and compression of the signal by the AGC. Since the dynamic range of the input of the system is practically limited, large perturbations in the signals due to noise will result in a clipping of the input signal. Also, since the AGC attempts to maintain a certain digital input power level, large noise levels can result in the input being "compressed" by the AGC. These two effects can cause underestimation of the input noise level.

Figure 4:
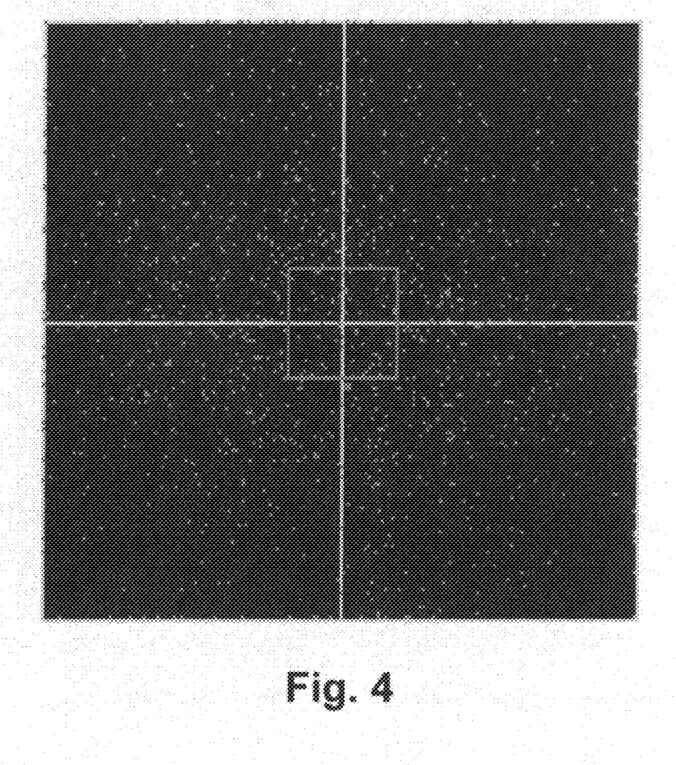
FIG. 4 depicts an exemplary calculation of a noise correction factor according to an exemplary embodiment of the present invention.

Thus, in exemplary embodiments of the present invention, a multiplicative correction can, for example, be applied to the CAZAC noise estimate, $\overline{N}^{CAZAC}$, to account for the deviation at high noise levels. The correction factor can, for example, be based upon the data portion of a PHY frame and can, for example, be determined by counting the number of symbol points that fall inside a square region at the center of the signal space. This is illustrated in FIG. 4. In exemplary embodiments of the present invention, this count can be implemented, for example, by setting thresholds and counting symbol points within the thresholds over a defined analysis period.

This count value can then be used, for example, to obtain a digital scaling factor according to the following empirical formula:

if(extrema_count>40) correction_factor=2×extrema_
        count+243 else correction_factor=323 where "extrema_count" is the number of data symbol points that fall inside the square region defined by |x|<0.5 and |y|<0.5, where the "nominal" QPSK constellation point is (x=1.0, y=1.0).

The final noise estimate is thus:

$\overline{N}^{CAZAC} = \overline{N}^{CAZAC} \times \text{correction\_factor}$

3.2 MRC Combining

As noted above, the general concept of Maximum Ratio Combining (MRC) is as follows: given N independent observations of a communications channel $S_1, S_2, \ldots, S_N$, what linear combination of these observations will maximize the "quality" (i.e. the signal-to-noise ratio) of the aggregate signal $$C = \sum_{k=0}^{N} a_k S_k,$$

where C is the aggregate signal and $\alpha_1, \alpha_2, \ldots, \alpha_N$ are the coefficients of the linear combination of symbols $S_1, S_2, \ldots, S_N$. The coefficients can, for example, be selected so that the average value is preserved:

$\alpha_0 + \alpha_1 + \alpha_2 + \ldots + \alpha_N = 1$

Thus, each of the $S_1, S_2, \ldots, S_N$ can be viewed as an observation of an underlying message m perturbed by noise, $S_k = m + n_k$ In exemplary embodiments of the present invention, the coefficients $\alpha_1, \alpha_2, \ldots, \alpha_N$ of the linear combination can be, for example, selected so that the noise components of each $S_k$ are averaged. This averaging reduces the variance of the noise in the combined output signal C. To see how this happens, note that $$C = \sum_{k=0}^{N} a_k S_k = \sum_{k=0}^{N} a_k m + \sum_{k=0}^{N} a_k n_k$$

where the noise term $$N = \sum_{k=0}^{N} a_k n_k$$

has the variance $$\text{Var}(N) = \sum_{k=0}^{N} a_k^2 \text{Var}(n_k)$$

Supposing that the noise random variables are independently and identically distributed ("IID"), then $$\text{Var}(N) = \sum_{k=0}^{N} a_k^2 \sigma^2$$
$$= \sigma^2 \left( \sum_{k=0}^{N} a_k^2 \right)$$

But, for the combiner coefficients the following is true (triangle inequality), $$\sum_{k=0}^{N} a_k^2 \leq 1$$

hence, $\text{Var}(N) \leq \sigma^2$

For the case of two antennas, i.e. N=2, $\text{Var}(N) = \sigma^2 (\alpha_0^2 + \alpha_1^2)$.

Thus, the optimum solution for the combiner weights in an IID case is $$a_0 = a_1 = \frac{1}{2},$$

so that $$\text{Var}(N) = \frac{\sigma^2}{2},$$

which is a 3 dB improvement in the signal-to-noise ratio.

In exemplary embodiments of the present invention, the Maximal Ratio Combiner (MRC) weights can be based upon the noise estimate that is computed for each antenna. For example, for the case of two antennas, the MRC weights can be computed according to the following formulas:

$$W0 = \frac{\overline{N1}}{\overline{N0} + \overline{N1}}$$

$$W1 = \frac{\overline{N0}}{\overline{N0} + \overline{N1}}$$

where $\overline{N0}$ and $\overline{N1}$ are the noise estimates for the individual antenna paths.

Figure 5:
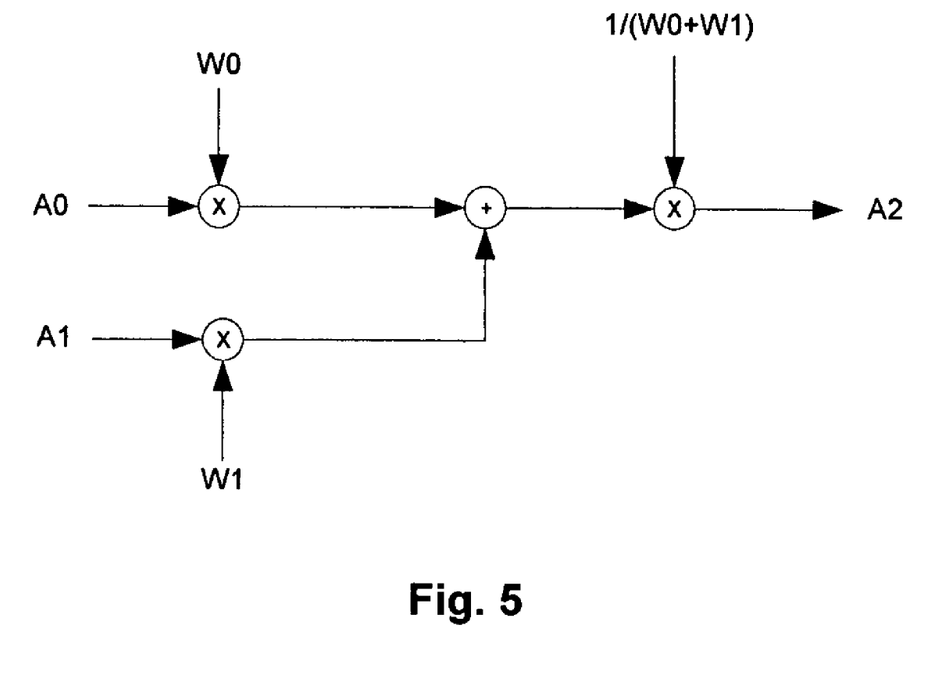
FIG. 5 depicts an exemplary hardware architecture according to an exemplary embodiment of the present invention.

In exemplary embodiments of the present invention, the hardware architecture depicted in FIG. 5 can be used to combine the signals. As can be seen with reference thereto, the depicted architecture avoids a (second) high speed division circuit in the sample processing chain by implementing the division operation after the summer.

In exemplary embodiments of the present invention, the combiner weights can be computed according to the formulas provided above. Additionally, for example, the reciprocal of the sum of the combiner weights can also be computed and used in the final multiplication stage to normalize back to unity.

FIG. 6 is a block diagram of an exemplary DDC according to an exemplary embodiment of the present invention. These depicted functionalities can, for example, be integrated into a single integrated circuit chip, either a stand alone DDC chip or within a larger chip performing other functionalities as well. For example, the functionalities depicted in FIG. 6 can be integrated into an exemplary overlay processor chip used in satellite radio broadcasting. It is noted that the block diagram of FIG. 6 takes as initial inputs the I,Q symbols from each antenna path, thus the respective antenna signals have been already demodulated in separate demodulators, in a similar fashion as is illustrated in FIG. 1, as described above.

It is further noted that although not shown in the example block diagram of FIG. 6, a switch diversity combiner (analogous to 112 of FIG. 1) could optionally be added, between the "Frame alignment" and "MRC weight computation" modules in the block at the right of the block diagram.

Although illustrated in the figures described above for a two antenna system, the methods of the present invention can be extended to any number of receive antennas. Systems and methods according to the present invention can be used, for example, in high performance satellite radio receivers to improve overall link margin availability.

While the present invention has been described with reference to certain exemplary embodiments, it will be understood by those skilled in the art that various changes may be made and equivalents may be substituted without departing from the scope of the invention. For example, diverse antenna combining can be extended to any number of receiving antennas. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

REFERENCE

[1] Brennan, D, *Linear Diversity Combining Techniques*, Proc. IRE, Vol. 47, No. 1, pp. 1075-1102, June 1959.

What is claimed:

1. A diverse antenna combining system, comprising:
at least two antenna signal paths, each communicably connected to an antenna, each antenna signal path having an RF tuner communicably connected to a demodulator, wherein each demodulator estimates SNR, time of arrival, phase alignment and noise estimation for its respective antenna signal;
a time alignment circuit communicably connected to each antenna signal path;
a maximum ratio combiner communicably connected to the time alignment circuit; and
a switch diversity combiner communicably connected to the time alignment circuit and the maximum ratio combiner,
wherein, in operation, the time alignment circuit uses the time of arrival estimate to align the multiple signals, and the maximum ratio combiner uses the SNR estimate for each antenna signal to weight each signal and generate a combined signal, from the multiple signals.

2. The system of claim 1, wherein the switch diversity combiner operates to de-correlate fading between the multiple signals.

3. The system of claim 1, wherein the switch diversity combiner determines whether a given antenna signal is entering a fade and notifies the maximum ratio combiner.

4. The system of claim 3, wherein if the switch diversity combiner notifies the maximum ratio combiner that an antenna signal is entering a fade, the maximum ratio combiner sets the weight of that signal to zero.

5. The system of either of claims 1 or 2, wherein the switch diversity combiner determines whether an antenna signal is entering a fade by continually monitoring a known symbol sequence transmitted multiple times per second.

6. The system of claim 5, wherein the known symbol sequence is 24 symbols long and is periodically transmitted with a period less than the coherence time of the channel.

7. The system of claim 5, wherein the known symbol sequence is a CAZAC sequence.

8. The system of claim 5, wherein the known symbol sequence is periodically transmitted with a period less than half the coherence time of the channel.

9. The system of claim 1, wherein there are two antenna signal paths and wherein the maximum ratio combiner weights the two antenna signal paths as follows:

$w1=(\sigma 2)2/[(\sigma 2)2+(\sigma 1)2];$ $w1=(\sigma 1)2/[(\sigma 2)2+(\sigma 1)2]$ wherein W1 is the weight for I/Q symbols received via the first antenna path, W2 is the weight for I/Q symbols received via the second antenna path, Sigma 1 ($\sigma 1$) is the noise power variance via the first antenna path; and Sigma 2 ($\sigma 2$) is the noise power variance via the second antenna path.

10. The system of claim 9, wherein the two signal paths are combined using the following equation:

$Ic+j*Qc=(I1+jQ1)*w1+(I2+jQ2)*w2,$ wherein I1 and I2 are the in-phase symbols derived from the first and second antenna paths, Q1 and Q2 are the quadrature symbols derived from the first and second antenna paths 1, and Ic/Qc are the in-phase and quadrature symbols which are output by the maximum ratio combiner.

11. A method for performing antenna diversity combining, comprising:
- receiving at least two antenna signals from different signal paths;
- separately tuning and demodulating each antenna signal, wherein said demodulating includes estimating SNR and time of arrival;
- using the time of arrival estimates to align the multiple signals using the SNR estimates for each antenna signal to weight each antenna signal and generate a combined signal; and
- de-correlating fading between the multiple antenna signals.

12. The method of claim 11, wherein the de-correlating determines whether a given antenna signal is entering a fade and if so sets the weight for that antenna signal at zero.

13. The method of claims 11 or 12, wherein the de-correlating is implemented in a switch diversity combiner circuit.

14. The method of claim 12, wherein the determination of whether an antenna signal is entering a fade is done by continually monitoring a known symbol sequence transmitted multiple times per second.

15. The method of claim 14, wherein the known symbol sequence is 24 symbols long and is periodically transmitted with a period less than the coherence time of the channel.

16. The method of claim 15, wherein the known symbol sequence is a CAZAC sequence.

17. The method of claim 16, wherein the known symbol sequence is periodically transmitted with a period less than half the coherence time of the channel.

18. The method of claim 11, wherein there are two antenna signal paths and wherein the two antenna signal paths are weighted as follows:

$$w1=(\sigma2)2/[(\sigma2)2+(\sigma1)2];$$

$$w2=(\sigma1)2/[(\sigma2)2+(\sigma1)2],$$

wherein w1 is the weight for I/Q symbols received via the first antenna path, w2 is the weight for I/Q symbols received via the second antenna path, Sigma 1 ($\sigma1$) is the noise power variance via the first antenna path; and Sigma 2 ($\sigma2$) is the noise power variance via the second antenna path.

19. The method of claim 18, wherein the two signal paths are combined using the following equation:

$$Ic+j*Qc=(I1+jQ1)*w1+(I2+jQ2)*w2,$$

wherein I1 and I2 are the in-phase symbols derived from antenna paths 1 and 2 respectively, Q1 and Q2 are the quadrature symbols derived from antenna paths 1 and 2 respectively, and Ic/Qc are the in-phase and quadrature symbols which are outputted.

20. The system of claim 1, wherein the demodulator, time alignment circuit, maximum ratio combiner and switch diversity combiner are implemented in a single integrated circuit.

* * * * *